United States Patent [19]
McClure

[11] Patent Number: 5,381,126
[45] Date of Patent: Jan. 10, 1995

[54] PROGRAMMABLE DIFFERENCE FLAG LOGIC

[75] Inventor: David C. McClure, Carrollton, Tex.

[73] Assignee: SGS-Thompson Microelectronics, Inc., Carrollton, Tex.

[21] Appl. No.: 923,855

[22] Filed: Jul. 31, 1992

[51] Int. Cl.$^6$ .............................................. G05B 1/00
[52] U.S. Cl. .................. 340/146.2; 307/355; 365/189.01
[58] Field of Search ............ 307/355; 340/146.2; 365/189.01

[56] References Cited

U.S. PATENT DOCUMENTS

| | | | |
|---|---|---|---|
| 4,220,990 | 9/1980 | Alles | 395/550 |
| 4,755,988 | 7/1988 | Nelson et al. | 370/105.1 |
| 4,935,719 | 6/1990 | McClure . | |
| 5,084,841 | 1/1992 | Williams et al. . | |

FOREIGN PATENT DOCUMENTS 0395210 10/1990 European Pat. Off. .

Primary Examiner—Timothy P. Callahan
Attorney, Agent, or Firm—Renee M. Larson; Lisa K. Jorgenson; Richard K. Robinson

[57] ABSTRACT

Difference flag logic suitable for use in a FIFO memory is modified to quickly generate FIFO flag status through the use of programmable, resettable counters which eliminate the need for subtractor circuitry. A comparator is used to compare a value from a read counter with a value from a write counter. The subtractor function is replaced by offsetting the read count from the write count by a value equal to the desired FIFO flag value. Offset of the read count from the write count is accomplished by utilizing counters which provide programmable resettability. Use of programmable, resettable counters allows FIFO flag values to be chosen and implemented very easily. For instance, it is possible for a user to change from an almost full FIFO flag to a half full FIFO flag without changing any hardware at all. The counters are simply programmed and reset accordingly.

57 Claims, 3 Drawing Sheets

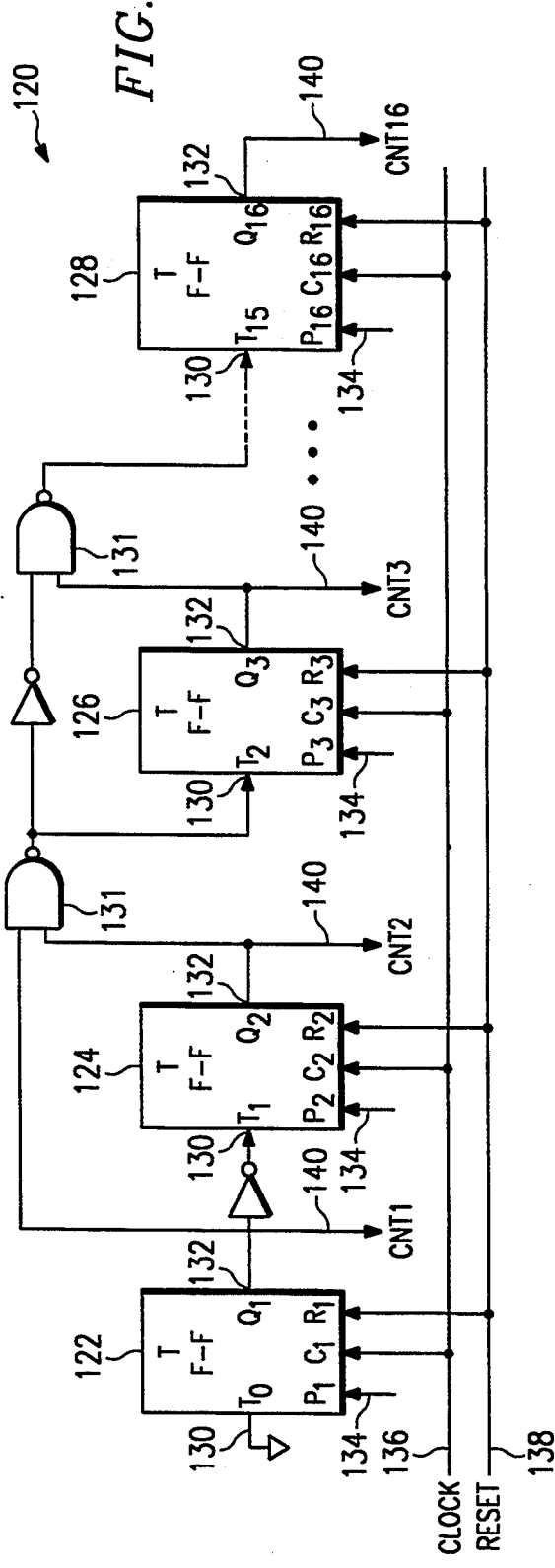
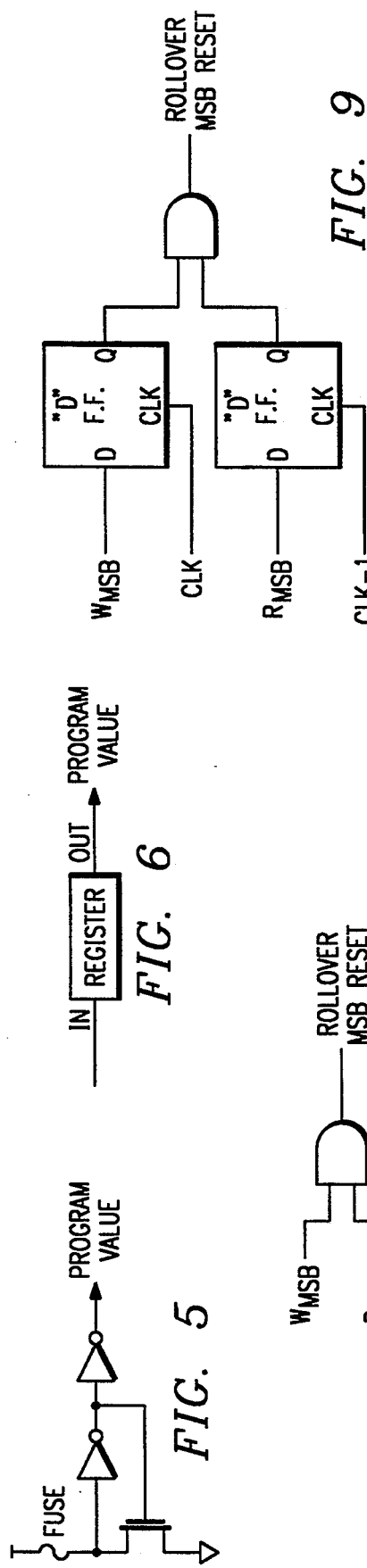

PROGRAMMABLE DIFFERENCE FLAG LOGIC

CROSS REFERENCE TO RELATED APPLICATIONS

The subject matter of the present application is a continuation-in-part of copending U.S. application, titled "Parallelized Difference Flag Logic", Attorney Docket No. 91-C-149, filed on May 29, 1992, Ser. No. 07/890,919, assigned to the assignee hereof, which is herein incorporated by reference.

The subject matter of the present application is related to copending U.S. application, titled "Serialized Difference Flag Circuit", Attorney Docket No. 91-C-150, filed on Jun. 22, 1992, Serial No. 07/901,667, assigned to the assignee hereof, which is herein incorporated by reference.

BACKGROUND OF THE INVENTION

1. Field of the Invention

The present invention relates generally to integrated circuits, and more specifically to a difference flag circuit for use in FIFO memories.

2. Description of the Prior Art

First In First Out (FIFO) memories are used in a variety of applications as an interface between two or more devices which transmit data at different rates of speed. Typical interface applications for FIFOs include placement between a computer and a printer or between a computer and a high speed modem. Because of the speed difference between devices, data stored inside a FIFO may be read out of the FIFO at a different rate than it was written into the FIFO. Since FIFOs are capable of receiving data at a rate different than the rate at which data is read, it is important to quantify the amount of data in the FIFO. Therefore, a FIFO has one or more flags which indicate the data status of the FIFO. Typical FIFO flags indicate full, empty, and half-full data status.

FIFO flag circuitry has historically included counters, subtractors, and comparators. As is well known in the art, counters generate the signals which provide the read and the write "counts" which are utilized by both subtractors and comparators. The subtractor determines the difference between two values being compared, namely the read and write "counts" from read and write counters. That difference is then presented as an input to a corresponding comparator. The comparator determines the relationship between this difference value and a predetermined value which is derived from a flag value. The appropriate comparator output signal is then generated. The FIFO flag signal is not determined until the subtractors and the comparators have completed their tasks. U.S. Pat. Nos. 4,974,241, issued Nov. 27, 1990 and 4,935,719 issued Jun. 19, 1990 both in the name of inventor David C. McClure, discuss use of serial subtractors and serial comparators to generate a FIFO flag logic in the prior art. Traditionally, subtractor circuitry has been slower than comparator circuitry, and so generation of the FIFO flag was impeded as the comparator circuitry waited on the subtractor circuitry. This wait can be quite long in the prior art where serial subtractors and comparators dictated long signal propagation delays. By eliminating the need for subtractors in FIFO flag logic circuitry, the FIFO flag signal may be more quickly generated. U.S. Pat. No. 4,891,788 by inventor Gerard A. Kreifels which issued Jan. 2, 1990 gives insight on prior art techniques for generating FIFO flag logic without the use of a subtractor.

In the prior art, serial magnitude comparators are a common form of comparator circuits. They have a number of individual bit comparators that together serially determine the magnitude of a number relative to another number. First, the least significant bits (LSBs) of the two numbers are compared before comparing the next bits, the LSB+1. This process continues serially until the most significant bits (MSBs) are compared. The serial process can be quite time consuming; at least 16 gate delays will be incurred for comparing two 16 bit words.

The individual bit comparators which comprise a serial magnitude comparator have four inputs: two inputs derived from the two bits to be compared, an input from the compare output of the previous bit comparator, and an input equal to one of the two bits being compared. The compare output of a bit comparator is input to the subsequent bit comparator and reflects whether the magnitude of one bit is equal to, less than, or greater than the magnitude of the second bit. If the two bits being compared are equal, then the compare input is passed through the bit comparator as the compare output. If, however, the two bits are unequal in magnitude, then the input equal to the first bit of the two bits being compared is passed through as the compare output. This comparison process starts with the least significant bit (LSB) comparator and continues until the most significant bit (MSB) comparator finishes its comparison operation. The bit comparator with the highest order bit of difference determines the state of the final compare output.

The gate delays associated with serial magnitude comparators and subtractors can have an adverse effect on generating a FIFO flag signal in a timely manner. Prior art FIFO flag logic, which is dependent on the comparator and subtractor, must be generated quickly. If the magnitude comparator is slow, it will have an adverse affect on how quickly flag logic may be generated and overall FIFO performance will suffer. A fundamental way to enhance the speed at which FIFO flag logic is generated is to minimize propagation and gate delays associated with serial magnitude comparators. It would be desirable to accomplish this using current magnitude comparator design. The speed at which FIFO flag logic is generated may be further enhanced by eliminating the need for subtractor circuitry altogether.

SUMMARY OF THE INVENTION

Difference flag logic suitable for use in a FIFO memory is modified to quickly generate FIFO flag status through the use of programmable, resettable counters which eliminate the need for subtractor circuitry. A comparator is used to compare a value from a read counter with a value from a write counter. The subtractor function is replaced by offsetting the read count from the write count by a value equal to the desired FIFO flag value. Offset of the read count from the write count is accomplished by utilizing counters which provide programmable resettability. Use of programmable, resettable counters allows FIFO flag values to be chosen and implemented very easily. For instance, it is possible for a user to change from an almost full FIFO flag to a half full FIFO flag without changing any hardware at all. The counters are simply programmed and reset accordingly.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 4 is a block diagram of Toggle Flip-Flops used in a programmable resettable counter according to the present invention;

FIG. 5 is a schematic diagram of a fuse used to generate a program value;

FIG. 6 is a block diagram of a register used to generate a program value;

FIG. 8 is a schematic diagram showing logic for determining the Rollover MSB Reset signal;

FIG. 9 is a schematic diagram showing an alternate embodiment for determining the Rollover MSB Reset signal.

DESCRIPTION OF THE PREFERRED EMBODIMENT

A FIFO is a First in First Out memory typically used in applications between machines which transmit and receive data at different rates of speed: for instance, between a computer and a printer. Writing data into the FIFO at a different rate of speed than reading data out of the FIFO makes it necessary to know how much data is actually in the FIFO at any particular point in time. The FIFO memory outputs its data status through the use of a FIFO flag. Comparators are frequently used in conjunction with subtractors in FIFO memory circuits to generate FIFO flags. The comparator must wait for the subtractor output to become valid before beginning the comparison function, so it is desirable to have FIFO flag circuitry which does not utilize subtractors. Also, eliminating subtractor circuitry reduces required layout area and associated circuitry.

The FIFO flag output indicates the data status of the FIFO and so may indicate that the FIFO is full, half full, and empty, for instance. In order to determine FIFO data status, it is necessary to track how many bits have been written into and how many bits have been read out of the FIFO. Also, it is necessary to know the relationship between the magnitude of two numbers, such as a write count and a read count, and whether the magnitude of one number is equal to, less than, or greater than the magnitude of the second number. Comparing the magnitude of these numbers is accomplished through the use of a magnitude comparator circuit inside the FIFO.

Figure 1:
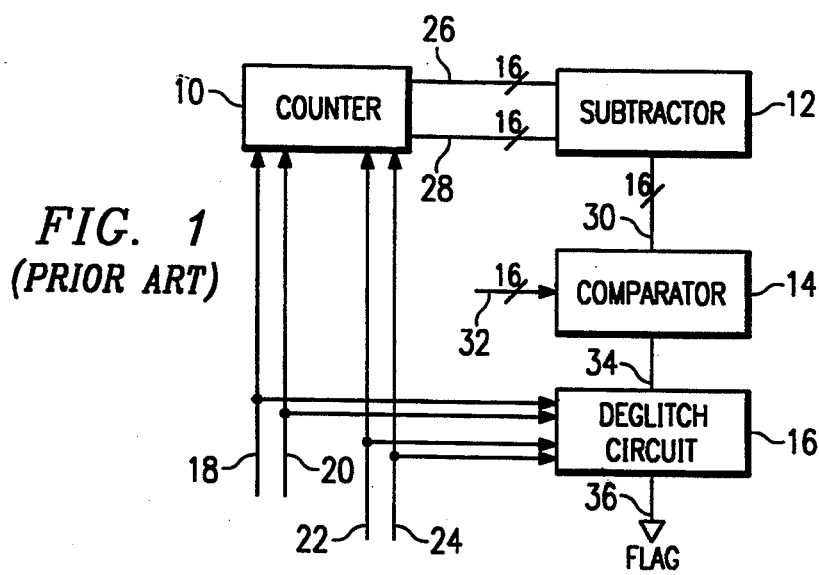
FIG. 1 is a block diagram of a FIFO flag generation circuit according to the prior art.

Referring to FIG. 1, a block diagram of a FIFO Flag generation circuit according to the prior art is shown. The FIFO Flag has a counter block 10, a subtractor block 12, a comparator block 14, and a deglitch block 16. The write clock 18, the read clock 20, the write reset clock 22, and the read reset clock 24 are input signals to both the counter block 10 and the deglitch block 16. The counter block 10 takes these input signals and generates a write count 26 and a read count 28 which are input to the subtractor block 12 which in turn outputs a difference signal 30. This difference signal 30 and a program value 32 are input to the comparator block 14 which compares them in order to generate an output compare signal 34. As is well known in the art, the program value 32 is set to different values depending on the type of flag signal 36, such as empty, half full, or full, to be generated. Finally, the compare signal 34 as well as the write clock 18, the read clock 20, the write reset clock 22, and the read reset clock 24 are input to the deglitch block 36 which generates a flag output signal 36.

Figure 2:
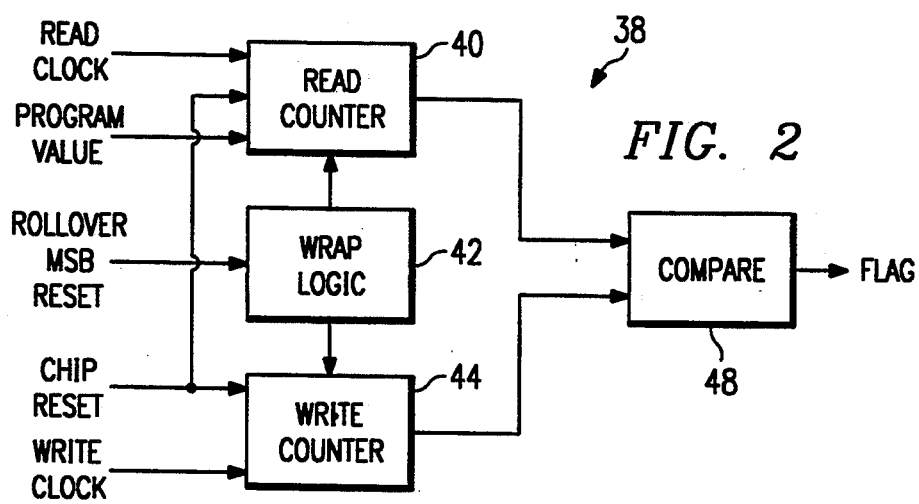
FIG. 2 is a block diagram of a FIFO flag generation circuit according to the present invention.

Referring to FIG. 2, a block diagram 38 of a FIFO flag generation circuit according to the present invention is shown. A read clock, a write clock, and a Chip Reset signal are provided as inputs to the read counter 40 and the write counter 44, respectively. Additionally, the read counter 40 receives as an input the Program Value signal. The Program Value is usually equal to the flag value which is predetermined by the user, and can programmed as needed. For instance, consider the case where it is necessary to change a given flag output from a half full FIFO flag to an almost full FIFO flag. Simply by changing the Program Value, the FIFO flag is set to almost full without changing the FIFO flag circuitry.

Compare block 48 uses the output signals of the read counter 40 and the write counter 44 to generate an output Flag signal. During a chip reset, the write counter 44 is reset to all zeros, and read counter 40 is reset to the required flag value as determined by the Program Value. The offset of the read counter from the write counter allows a FIFO flag signal to be generated without the use of subtractor circuitry as is the case in the prior art. Rollover MSB Reset is a signal determined by performing logic on the Most Significant Bit (MSB) of the read and write counters. When the MSBs of both the read and write counters are equal to 1, wrap logic 42 resets the read and write counter MSBs to 0. The Rollover MSB Reset signal prevents a wraparound problem from occurring and will be discussed in more detail later.

In the case where full, half-full, and empty FIFO flags are required, three distinct parallelized difference flag circuits as described above are required. The three flag circuits are laid out independently and physically separate from each other. Although there may be no benefits in chip layout area and component reduction, the invention offers the advantage of user programmable flags. Through programming the program value input to the counters, any desired flag value may be achieved.

For simplicity, consider a FIFO having 8 data locations. For the half-full flag condition, the flag value is equal to 4. The reset value of the write counter is 0000 while the corresponding reset value of the read counter is 0100, or 4 away from the write counter. Now consider the two-away-from-empty case where the flag value is equal to 2. Upon reset, the write counter is equal to 0000 while the corresponding read counter reset value is 0010, or 2 away from the write counter. When two different flag values will be needed simultaneously, two flag circuits are required. Counters with programmable resettability are used.

Figure 3:
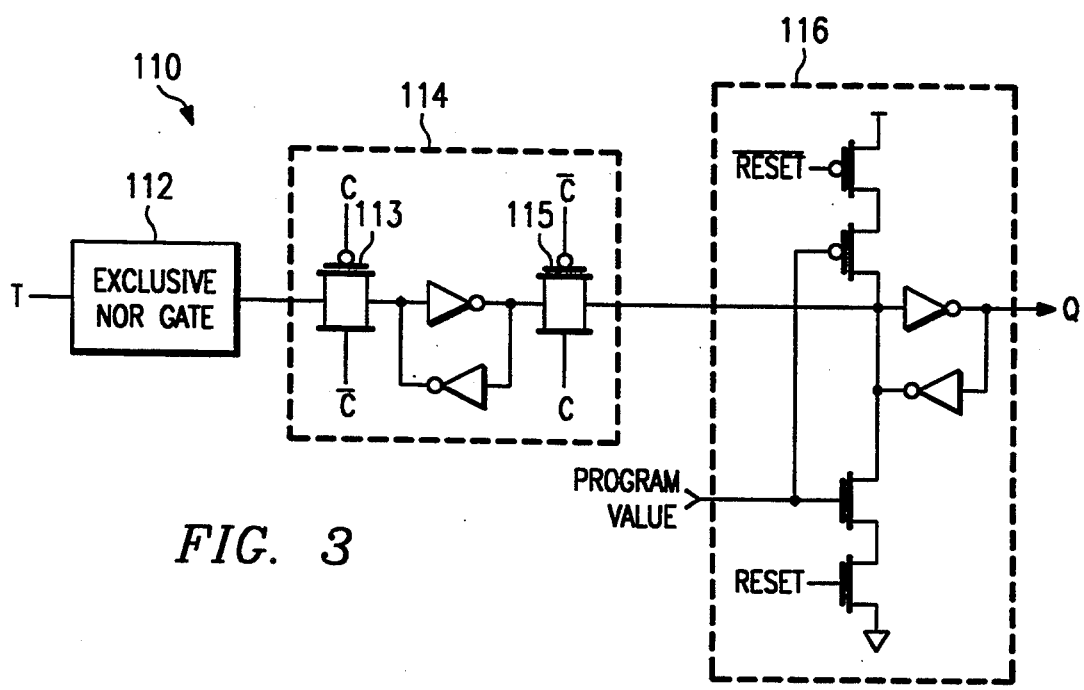
FIG. 3 is a schematic diagram of Toggle Flip-Flop logic circuitry used in counters according to the present invention.

Turning to FIG. 3, a schematic diagram of Toggle Flip-Flop logic circuitry 110 used in counters according to the present invention is shown. This circuitry gives the counter resettable programmability. Inputs to the T Flip-Flop circuitry are the toggle input, T, clock inputs C and $\overline{C}$, reset inputs RESET and, $\overline{\text{RESET}}$, and, finally, the Program Value input signal. Q is the output of the T Flip-Flop 110. T Flip-Flop 110 is composed of three sections 112, 114, and 116. Section 112 is an exclusive NOR gate which allows for the selective inverting or non-inverting of the output Q back into the flip flop. When the toggle input T is a logic low, data from output Q is inverted when it passes through gate 112, but when the toggle input T is a logic high, data is passed through unchanged.

Section 114 contains transmission gate 113, cross coupled inverters, and transmission gate 115. Transmission gate 113 acts as a Master whereas transmission gate 115 acts as a Slave. Both transmission gates 113 and 115 are never on at the same time, and have as inputs clock signals C and $\overline{C}$. First, transmission gate 113 is on while transmission gate 115 is off, allowing data to be latched by the inverters. Next, transmission gate 115 is on while transmission gate 113 is off. The state of the data is maintained and allowed to propagate out to section 116 as output Q. Section 116 has as inputs RESET, $\overline{\text{RESET}}$, and PROGRAM VALUE. PROGRAM VALUE and $\overline{\text{RESET}}$ are inputs to p-channel gates which are tied to a logic high level. PROGRAM VALUE and RESET are inputs to n-channel gates which are tied to a logic low level. Two cross coupled inverters are connected to the mid point between the n and p-channel gates. Section 116 of the Toggle Flip-Flop logic circuitry determines the state of output Q.

The circuitry of FIG. 3 operates such that, during reset, the RESET signal is a logic high, the $\overline{\text{RESET}}$ signal is a logic low, and the logic state of the Program Value input determines whether Q is a logic low or a logic high. If the Program Value input signal is a logic high, then Q is also a logic high. However, if the Program Value input signal is a logic low, then Q is also a logic low.

FIG. 4 shows a block diagram of a programmable resettable counter according to the present invention. The Toggle Flip-Flop described in FIG. 3 is duplicated for every bit of the read counter. It could also be used for the write counter if the user choose to reset it to something other than all zeroes. For instance, for a 16 bit counter, 16 T flip-flops would be needed as indicated in FIG. 4. Each T Flip-Flop 122, 124, 126, and 128 has as inputs a Toggle signal 130, a Program Value signal 134, a Clock signal 136, and a Reset signal 138. As described in conjunction with FIG. 3, output signal Q 132 is determined by the state of the Program Value input 134. During Reset, if Program Value input 134 is a logic high, then output Q 132 is also a logic high. However, if Program Value input 134 is a logic low, then output Q 132 is also a logic low.

For the initial T Flip-Flop 122, Toggle input 130 is tied to ground, a logic low. The output signal $Q_1$ 132 of T Flip-Flop 122 is the output $CNT_1$ of the least significant bit (LSB) T Flip-Flop. It is also the Toggle input signal 130 of the consecutive T Flip-Flop 124 as well as being one of two inputs to logic gate 131. Likewise, T Flip-Flop 124 generates an output signal $Q_2$ 132 which is dependent on the Program Value input $P_2$ 134. Output signal $Q_2$ 132 is the output signal for the LSB+1 and is designated $CNT_2$. The output signal $Q_1$ 132 from T Flip-Flop 122 and $Q_2$ from T Flip-Flop 124 are inputs to logic gate 131 whose output is the Toggle input signal 130 of successive T Flip-Flop 126. This process continues serially through the chain of T Flip-Flops until the most significant bit (MSB) flip flop 128 generates output signal $Q_{16}$, also shown as $CNT_{16}$.

As shown in FIG. 4, each bit of the counter has its own Program Value input 134. Program Value inputs 134 provide the counter with resettable programmability and may be generated or programmed by several different methods. FIG. 5 shows a schematic diagram of a fuse used to generate one bit of a Program Value. The fuse is blown to generate the desired Program Value; if the fuse is blown, Program Value 134 is equal to a logic low. If the fuse is intact, Program Value 134 is equal to a logic high. The most apparent advantage of using a fuse programming method is the flexibility it provides for FIFO manufacturers. Based upon the flag values most in demand from users, the manufacturer could produce fuse programmed FIFOs having any desired flag values. The disadvantage would be that the user is committed to the programmed flag value once it has been programmed. Such devices could also be made one-time programmable by themselves.

A second method used to program FIFO flag counters is using registers. FIG. 6 shows a block diagram of a register used to generate one bit of a Program Value 134. The user loads the register in a programming mode with desired flag values. The register, which could be a latch or flip-flop, can be used to generate a Program Value. A CMOS register or SRAM may be used at low cost, but it would require the user to reprogram the Program Value in the event of power-up and power-down. If, however, a non-volatile (NV) register such as an EPROM or EEPROM were used, the device would retain programmed values even after power-up or power-down conditions. An EEPROM could be reprogrammed with a variety of flag values as needed by the user. The disadvantage of using NV memories is that they are more expensive than, for instance, CMOS devices. It may also not be feasible to mix NV and CMOS or other technology in the same circuit.

Finally, the Program Value could be metal programmable. The manufacturing would be easy and inexpensive because only the last metal mask would need to be different to achieve different Program Values. A manufacturer could offer users several choices of FIFO flag values from a library of metal masks, for instance. The disadvantage of using metal programming is that the user has only limited flexibility; once a FIFO has been purchased, the counter offset and thus the flag value is set.

Using programmable, resettable counters to provide an offset between a read counter and a write counter without the use of a subtractor has been described. As shown in FIG. 1, a comparator 14 is needed to complete FIFO flag logic circuitry. The type of comparator used does not affect the operation of the counter offset. However, a parallel magnitude comparator, one that senses the magnitude of one signal relative to that of a second signal such as less than, greater than, equal to, will be discussed since it provides advantages such as speed over a plain comparator. The preferred embodiment using a parallel magnitude comparator is explained next.

Figure 7:
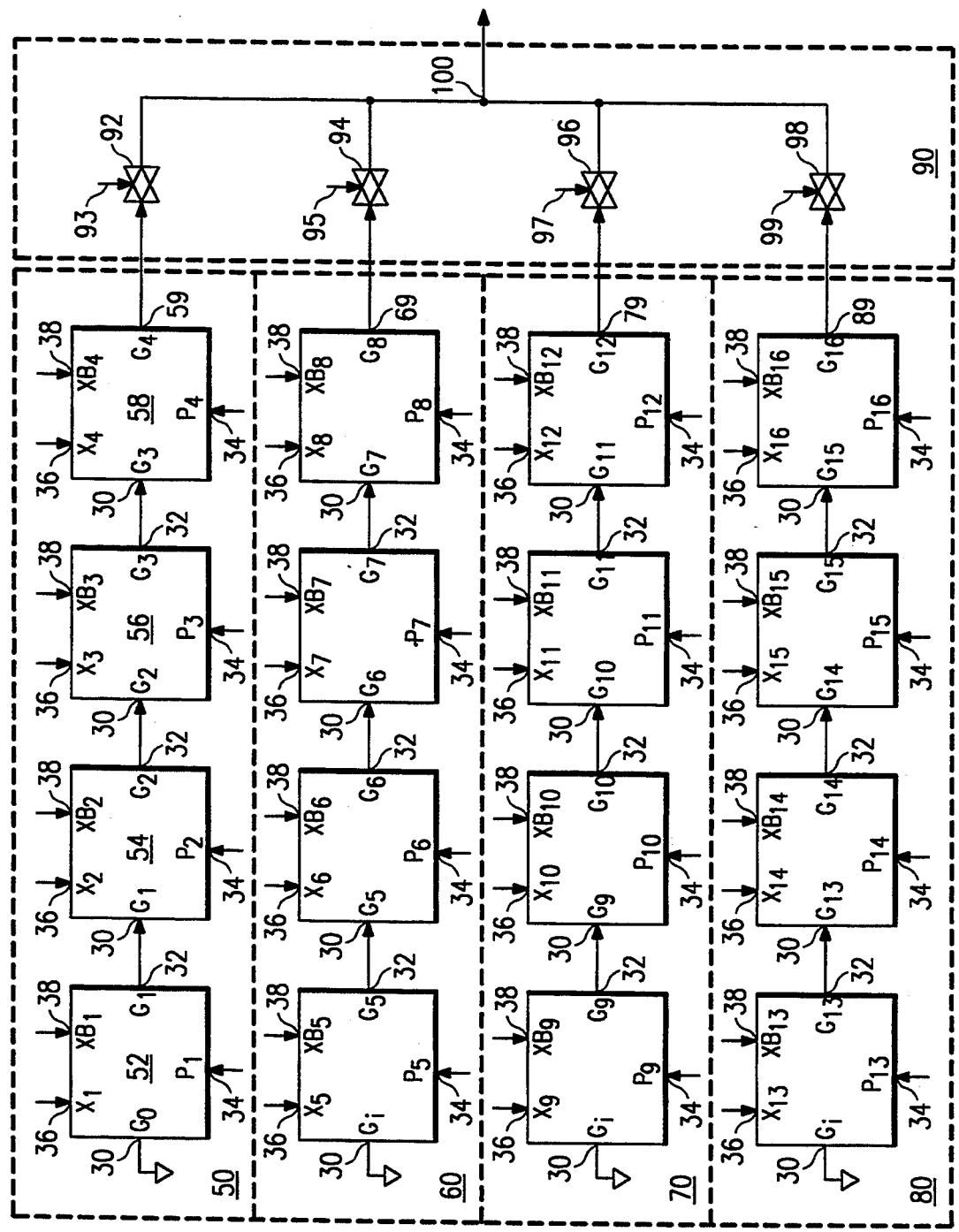
FIG. 7 is a schematic diagram of a parallel magnitude comparator according to the present invention.

FIG. 7 shows a schematic diagram of a parallel magnitude comparator according to the present invention which is responsible for determining the relationship between the magnitude of two numbers. The parallel magnitude comparator is comprised of bit comparators which are segmented into groups which operate independently of each other in parallel. The number of bit comparators needed is a function of the number of bits in the two numbers being compared. Referring to FIG. 7, the bit comparators are divided into comparator groups 50, 60, 70, and 80.

Every bit comparator has four inputs. The two bits to be compared are input to an exclusive OR gate, the output of which is input 36. Input 38, which is simply the inverse of input 36, could easily be generated internal to the bit comparator, in which case it would not be an input signal. The other two inputs to the bit comparators are the output of the previous bit comparator 30, and input 34, the first bit of the two bits being compared. Input 34 is different from program value 32 shown in FIG. 1. FIG. 7 shows two changing binary numbers being compared whereas FIG. 1 shows a binary number being compared with a fixed value represented by program value 32.

The truth table shown below is applicable to FIG. 7. If input bit 36 is a logic high, the two bits compared are different relative to each other, and input 34 is passed out as the compare output 32. If, however, input bit 36 is a logic low, the two bits compared have the same magnitude relative to each other, and compare input 30 is simply passed out as the compare output 32. As an example, if each of the four bit comparators 52, 54, 56, and 58 of comparator group 50 compares bits that are equal to each other, then the logic low compare input 30 of initial bit comparator 52 will be passed through subsequent bit comparators 54, 56, and 58 until it is the compare output 59 of the comparator group. At this point, the logic low compare output signal 59 will be an input to control element 90. At all times, as in this example, output compare 59 of the comparator group 50 is equal to compare output 32 of the bit comparator having the highest order bit difference.

TABLE 1

| Input 36 | Input 38 | Output 32 |
|----------|----------|-----------|
| 1 | 0 | Input 34 |
| 0 | 1 | Input 30 |

In a sixteen bit example, comparator group 50 compares the magnitude of the four least significant bits (LSBs) of two numbers. Comparator groups 60 and 70 compare the magnitude of bits 5–8 and 9–12, respectively, while comparator group 80 compares the magnitude of the most significant bits (MSBs), 13–16. Comparison of these bits occurs serially within the comparator groups, with comparator groups 50, 60, 70, and 80 operating in a parallel fashion to one another. Therefore, comparison of all sixteen bits occurs in the same amount of time required to compare four bits in the prior art serial magnitude comparator. Clearly this means an increase in performance for any system using a parallel magnitude comparator. One skilled in the magnitude comparator art will recognize that breaking the bit comparators into groups of four is only one of many ways to group the bit comparators.

The compare output signals 59, 69, 79, and 89 of each comparator group are inputs to the control element 90. Only one of these compare output signals, selected by control element 90, will be passed through the control element to the final compare output 100. Control element 90 has a plurality of transmission gates 92, 94, 96, and 98 each of which corresponds to one comparator group: 50, 60, 70, and 80, respectively. Each transmission gate has as inputs the compare output from the corresponding comparator group and an logic input determined by boolean equations. Transmission gate 92 has as its inputs compare output 59 of comparator group 50 and logic input 93. The logic inputs 93, 95, 97, and 99 ensure that only the compare output of the comparator group having the highest order bits with magnitude difference will be passed out of control element 90 as final compare output 100. If none of the bits are different, then compare output 59 of the lowest order comparator group 50 is passed through control element 90 as final compare output 100.

Logic inputs 93, 95, 97, and 99 are determined by the following equation: $S_N = X_N + X_{N-1} + X_{N-2} + X_{N-3}$, where $X_N$ is the result of exclusive ORing the two bits to be compared. Specifically, the logic inputs are as follows:

Input $99 = S_{16} = X_{16} + X_{15} + X_{14} + X_{13}$

Input $97 = S_{12} * \overline{S_{16}} = (X_{12} + X_{11} + X_{10} + X_9) * \overline{S_{16}}$ Input $95 = S_8 * \overline{S_{12}} * \overline{S_{16}} = (X_8 + X_7 + X_6 + X_5) * \overline{S_{12}} * \overline{S_{16}}$ Input $93 = \overline{S_8} * \overline{S_{12}} * \overline{S_{16}}$ When one of the logic inputs 93, 95, 97, or 99 is high, its corresponding transmission gate turns on and allows the corresponding comparator group compare output, 59, 69, 79, or 89, to pass through the transmission gate. If, however, the logic input is low, its corresponding transmission gate turns off and does not allow the corresponding compare output signal to pass through the transmission gate. These equations guarantee that the compare output of the comparator group having the highest order of bit difference is passed out as final compare output 100. For instance, if two binary numbers have unequal magnitudes for bit 14 and also for bit 2, the logic inputs ensure that compare output 89 of comparator group 80 will be passed out as final compare output 100 since bit 14 is more significant than bit 2. Determination of logic inputs 93, 95, 97, and 99 occurs at the same time comparator groups 50, 60, 70, and 80 perform magnitude compare operations. This parallel operation allows the appropriate compare output 59, 69, 79, or 89 to be selected by control element 90 and passed out as final compare output 100 immediately after the comparator groups have completed comparison operations. Control element 90 adds no delay to the parallel magnitude comparator comparison time, since control element 90 finishes its operations prior to or at the same time group compare outputs 59, 69, 79, and 89 are ready to be passed through the control element 90.

The present invention as described in FIG. 7, would result in five gate delays: one gate delay for each magnitude comparator operating serially in a comparator group, such as bit comparators 52, 54, 56, and 58 in comparator group 50, and one gate delay for control element 90. The invention requires no buffering since the bit comparators are split into groups of four. This is a marked improvement over the prior art serial magnitude comparator which results in at least 16 gate delays, one for each bit comparator. In the 16 bit example, buffering is needed to avoid the signal degradation which would occur from propagating through 16 serially connected bit comparators. The gate delay is even greater when buffering is used in the serial magnitude comparator. If an invertor were placed after every fourth bit comparator, four extra gate delays would be added for a total of 20 gate delays.

In the preferred embodiment of the present invention, the need for subtractor circuitry is replaced by setting the read counter to a value different from the value of the write counter. The offset value is equal to the value of the desired FIFO flag and is reflected in the Program Value input. FIG. 2 shows how a Program Value input to the read counter is used during a chip reset to set the read counter to its reset value. Also, the fact that a subtractor is not used in the FIFO flag logic circuitry means that provisions must be made to safeguard the integrity of the FIFO flag. For purposes of simplicity, consider a FIFO with 8 data locations which generates a half full flag. For the half full flag, the flag value will be equal to 4 which is half of 8. During a chip reset, the write counter reset value is equal to 0 (0000) while the read counter reset is offset from the write counter reset by the value of the flag. Therefore, the read counter reset is equal to 4 (0100), the program value. The difference between the write counter reset and the read counter reset is 4, the value of the FIFO flag. FIG. 2 shows that, during a chip reset, use of a program value ensures that the read counter 40 is reset to a value offset from the write counter 44 by the value of the FIFO flag.

As shown in FIG. 7 and described above, when the write bit is greater than the corresponding read bit, compare output 32 is equal to a logic high. However, when the write bit is less than the corresponding read bit, compare output 32 is equal to a logic low. When the write bit is equal to the corresponding read bit, compare input 30 is passed through as compare output 32. Upon reset, the read counter and write counter are equal to 0100 and 0000, respectively. After performing 3 writes, the read counter is still 0100, but the write counter is now 0011. And, because the write counter is less than the read counter, compare output signal 59 of comparator group 50 is equal to 0. In this 4 bit example, only compare output signal 59 of comparator group 50 is used. However, in a more realistic 16 bit example, 4 compare output signals 59, 69, 79, and 89 from comparator groups 50, 60, 70, and 80, respectively, are used. Next, 1 more write is performed meaning that the FIFO is now half full. After the fourth write, the read counter is still 0100, but the write counter is now equal to 0100. At this point, since the read and write counters are equal, compare output signal 59 is still equal to 0 which accurately reflects a half full flag. One more write means that the write counter, now equal to 0101, is greater than the read counter. Therefore, compare output signal 59 changes in value and is now equal to 1. This value of 1 accurately reflects greater than a half-full condition, namely, equal to or greater than half full +1.

The above example worked fine, because no wrap-around condition occurred. The following example builds on the above example and illustrates the wrap-around problem for a half-full flag. Starting at the reset condition, the read and write counter are 0100 and 0000, respectively. Upon 3 writes, the flag is equal to half-full −1 and the write counter increments to 0011. Compare output signal 59 is equal to 0 since the write counter is less than the read counter. Next, 10 reads and 10 writes are performed, causing the read and write counters to increment to 1110 and 1101, respectively. Because the same numbers of reads as writes was performed, the flag is still equal to half full −1, and compare output signal 59, which is still equal to 0, accurately reflects the flag status. An additional write brings the total number of writes to 14 and the number of reads to 10. At this point, the flag is half-full as signified by the difference of 4 between the read and write counts. Read counter remains 1110 and the write counter increments one to 1110. Compare output signal 59 is equal to 0, correctly representing the half-full flag status. After still another write, the read and write counters are 1110 and 1111, respectively. This is the first time the write counter is greater than the read counter, and so the compare output signal 59 is equal to 1, indicating the new flag status is half full +1. The wrap-around condition occurs in the next step. Performing 1 more write, makes the write count "wrap-around" and reset itself to 0000; the read counter is still equal to 1110. According to the logic rule used, since the write counter is less than the read counter, compare output signal 59 is equal to 0. However, the zero value of compare output signal 59 does not accurately reflect the flag status which is half full +2. The wraparound of the write counter has caused an error condition.

To handle the wrap-around condition described above, the most significant bits (MSBs) of the read and write counter are reset to 0 when both are equal to 1. FIG. 2 shows the use of the Rollover MSB Reset signal to reset the MSBs of both the read and write counter. To illustrate the effectiveness of this method, consider the following example. After resetting the read and write counters and then performing 8 writes, the read and write counters are equal to 0100 and 1000, respectively. The FIFO is full, and compare output signal 59 is equal to 1, which indicates an equal to or greater than half full +1 condition. Next 4 writes and 4 reads are performed, resulting in the read and write counters being incremented to 1000 and 1100, respectively. Compare output signal 59 is equal to 1 since the FIFO is still full. After the 4 reads and writes, the MSB of both the read and write counter are equal to 1. At this point, both MSBs are reset to 0, resulting in a read count of 0000 and a write count of 0100. Compare output signal 9 is still equal to 1, consistent with the FIFO still being full. Resetting of the MSBs to 0 could occur anytime before the write count wrapped around. In this case, resetting could be done during any of the subsequent 3 write cycles.

Consider now the wrap-around condition for a full flag example. In the full flag case, the read counter and write counter are set to 0111 and 0000, respectively. The difference between the counters is equal to 7 for the full flag case. Starting at a reset state and performing 7 writes yield a read count and write count of 0111 and 0111, respectively. Since the counts are equal, compare output signal 59 is equal to 0. When 1 more write is performed, the FIFO is full, the write count increments to 1000, and the write count is greater than the read count resulting in compare output signal 59 being equal to 1. Performing 1 read cycle means that the FIFO is full −1, and both the write count and read count are equal to 1000. The MSBs are reset to 0, and the resultant read and write counts are 0000 and 0000, respectively. Compare output signal 59 is equal to 0, accurately reflecting the fact that the FIFO is full −1. Resetting the read and write count MSBs to 0 when both the read and write counts are equal to 1000 could have been done anytime during the subsequent 7 write cycles, since wrap-around would not have happened until the eighth write cycle.

Finally, consider the empty flag example where the read and write reset values are both equal to 0000. At reset, compare output signal 59 is 0 since the read and write counts are equal. After the first write, compare output signal 59 is 1 since the FIFO is no longer empty. Likewise, during the next 7 writes, compare output signal is equal to 1. After the 7th write, the read and write count are 0000 and 1000, respectively. Performing 7 reads increments the read count to 0111. The read count is still less than the write count and so compare output signal 59 is still equal to 1, accurately reflecting that the FIFO is not empty, 7 subsequent writes and 1 subsequent read increments the read and write count to 1000 and 1111, respectively. Since, at this point, the MSBs are both equal to 1, they must be reset to 0 before the write count wraps around the next write cycle. This is an example where the MSBs must be reset to 0 before the very next write. If this small amount of time is insufficient for a specific application, another bit may be added to the counter to allow for more time to reset the MSBs of the counters. In the empty flag example just described, a 5 bit counter instead of the 4 bit counter could be used with the 5th bit resettable when both MSBs are equal to 1. This would provide 8 additional cycles to perform the MSB reset function.

Resetting the read and write count MSBs is accomplished by the generation of a Rollover MSB Reset signal as shown in FIGS. 8 and 9. FIG. 8 is a schematic diagram showing logic for determining the Rollover MSB Reset signal. The MSBs of both the read and write counts are input to an AND logic gate. When both MSBs are equal to a 1, then the Rollover MSB Reset signal is also equal to a logic 1.

FIG. 9 is a schematic diagram showing an alternate embodiment for determining the Rollover MSB Reset signal. In this embodiment, the Rollover MSB Reset signal is synchronized to a clock signal(s). In FIG. 9, clock signals CLK and CLK-1 may or may not be the same clock. The MSBs of the read and write count, WMSB and RMSB are input to their respective D Flip Flop. Upon receipt of the clock signal input, the MSB is latched out of the D Flip Flop as output Q. The Q outputs from both D Flip Flops are gated into logic which produces a valid Rollover MSB Reset signal when both WMSB and RMSB are equal to a 1. The D Flip Flop could easily be replaced by a D latch which would generate the same Rollover MSB Reset signal. When a valid, logic high, Rollover MSB Reset signal is produced as shown in FIG. 8 or FIG. 9, then the MSB of the read count and the write count is reset to 0.

The programmable difference flag logic described above has important advantages over the prior art FIFO flag generation circuitry. Programmable and resettable counters allow for maximum flexibility in choosing and implementing desired FIFO flag values as necessary. For instance, it may be necessary to change a FIFO flag value from almost empty to half full. Rather than changing circuitry to accommodate this need, a new Program Value is used to program the counters such that the read counter is offset from the write counter by the new Program Value. Although any comparator may be used in the difference flag logic circuitry, the preferred embodiment described above illustrates the use of a parallel magnitude comparator which speeds up the comparison process in proportion to the number of parallel comparator groups used. Also, the use of a serial magnitude comparator could accomplish many of the same benefits as a parallel magnitude comparator. Additionally, a true magnitude comparator determines if one value is less than, equal to, or greater than another value. The use of a magnitude comparator instead of a comparator which only checks that two values are equal helps avoid flag arbitration problems associated with such a comparator.

While the invention has been particularly shown and described with reference to two preferred embodiments, it will be understood by those skilled in the art that various changes in form and detail may be made therein without departing from the spirit and scope of the invention.

What is claimed is:

1. Difference flag circuitry, comprising:
   a comparator which compares the magnitude between a first binary value and a second binary value;
   a first counter and a second counter which generate said first binary value and said second binary value, respectively, wherein at least one of said first counter or said second counter is programmable;
   means for generating a flag, by initializing said first binary value to a value which is programmably offset from said second binary value by the value of said flag through the use of said first counter and said second counter.

2. The difference flag circuitry of claim 1, wherein at least said first counter or said second counter is initialized to a programmable value.

3. The difference flag circuitry of claim 2, wherein at least one of said first counter or said second counter has a program value input and a count output.

4. The difference flag circuitry of claim 3, wherein upon initialization said program value input determines the state of said count output.

5. The difference flag circuitry of claim 4, wherein when said program value input is equal to a specific logic state, said count output is equal to the same specific logic state.

6. The difference flag circuitry of claim 5, wherein when said program value is equal to a logic high, said count output is also equal to a logic high, and when said program value is equal to a logic low, said count output is also equal to a logic low.

7. The difference flag circuitry of claim 2, wherein at least one of said first counter and said second counter have as inputs a reset signal, a program value input, and a clock signal.

8. The difference flag circuitry of claim 2, wherein said second counter is set to a fixed value during an initialization cycle.

9. The difference flag circuitry of claim 8, wherein during an initialization cycle, the fixed value of said second counter is a logic zero.

10. The difference flag circuitry of claim 2, wherein during an initialization cycle, said first counter is initialized to a value determined by said program value input.

11. The difference flag circuitry of claim 10, wherein said program value input is derived from a desired FIFO flag value.

12. The difference flag circuitry of claim 2, wherein said first counter is a read counter and said second counter is a write counter.

13. The difference flag circuitry of claim 1, wherein at least one of said first and said second counters are comprised of a plurality of flip-flops.

14. The difference flag circuitry of claim 13, wherein the number of flip-flops corresponds to number of bits in said counters.

15. The difference flag circuitry of claim 14, wherein each of said flip-flops has as inputs a toggle signal, a program value, a clock signal, a reset signal, and has as an output a one bit count.

16. The difference flag circuitry of claim 15, wherein upon initialization said program value input determines the state of said one bit count output.

17. The difference flag circuitry of claim 16, wherein when said program value input is equal to a specific logic state, said one bit count output is equal to the same specific logic state.

18. The difference flag circuitry of claim 17, wherein when said program value is equal to a logic high, said one bit count output is also equal to a logic high, and when said program value is equal to a logic low, said one bit count output is also equal to a logic low.

19. The difference flag circuitry of claim 15, wherein internal to each of said flip-flops, there are two transistors associated with said program value input, one transistor associated with said reset signal, and one transistor associated with the inverse of said reset signal.

20. The difference flag circuitry of claim 19, wherein internal to each of said flip-flops, said program value input transistors are connected in series with said reset signal transistors.

21. The difference flag circuitry of claim 20, wherein the transistor associated with the inverse of said reset signal and one of the transistors associated with said program value are connected in series and connected to a logic level.

22. The difference flag circuitry of claim 21, wherein the transistor associated with said reset signal and the other transistor associated with said program value are connected in series and connected to a second logic level.

23. The difference flag circuitry of claim 22, wherein between the transistors connected to a first logic level and the transistors connected to a second logic level, there is an electrical node which corresponds to said one bit count output.

24. The difference flag circuitry of claim 1, further comprising:
said comparator is a plurality of bit comparators divided into comparator groups that generate an output signal, wherein each of said bit comparators compares the magnitude between a bit of a first binary value and a bit of a second binary value;
a control element, having inputs connected to the outputs of said comparator groups, which selects one of the outputs of said comparator groups to be output from said control element;
means for preventing said difference flag circuitry from indicating the incorrect relative difference between said first binary value and said second binary value.

25. The difference flag circuitry of claim 24, wherein each said comparator group is independent from every other comparator group.

26. The comparator group of claim 25, wherein said comparator groups compare a plurality of bits simultaneously.

27. The comparator group of claim 25, wherein said comparator groups and said control element perform their respective functions simultaneously.

28. The difference flag circuitry of claim 24, wherein each of said bit comparators generates a compare output which is input to the subsequent bit comparator.

29. The difference flag circuitry of claim 28, wherein the initial bit comparator of said comparator group has as its compare input a signal set to a predetermined level.

30. The difference flag circuitry of claim 28, wherein each said bit comparator has a first value input, a second value input, and a third value input.

31. The difference flag circuitry of claim 30, wherein said first value input is a one bit value determined by performing logic on the bit of said first binary value and the bit of said second binary value to be compared.

32. The difference flag circuitry of claim 31, wherein said second value input is equal to the value of the bit of said first binary value to be compared.

33. The difference flag circuitry of claim 31, wherein the bit of said first binary value and the bit of said second binary value to be compared are a FIFO read count and a FIFO write count, respectively.

34. The difference flag circuitry of claim 30, wherein said third value input is the compare output signal generated by a previous bit comparator.

35. The difference flag circuitry of claim 24, wherein said control element determines which said comparator group contains the highest order corresponding bits which do not match.

36. The control element of claim 35, wherein said control element has a plurality of gates each of which corresponds to one of said comparator groups.

37. The control element of claim 36, wherein said control element has a plurality of transmission gates each of which corresponds to one of said comparator groups.

38. The control element of claim 36, wherein said control element has a plurality of tristateable gates each of which corresponds to one of said comparator groups.

39. The comparator of claim 36, wherein said gate receives a first and a second value input which determines whether said gate will allow the first value input to be output from said gate.

40. The gate of claim 39, wherein the first value input is the output from the corresponding said comparator group.

41. The gate of claim 40, wherein the second value input is determined by whether the bits compared in the current said comparator group or higher order said comparator groups match.

42. The gate of claim 39, wherein said gate is capable of not allowing said first value input of said gate to be output from said gate.

43. The gate of claim 39, wherein only one of the plurality of gates may allow said first value input of said gate to be output from said gate.

44. The control element of claim 36, wherein there are four said comparator groups each of which has four bit comparators.

45. The control element of claim 44, wherein each of four said comparator groups corresponds to one said gate for a sixteen bit FIFO flag generation circuit.

46. The difference flag circuitry of claim 24, wherein said prevention means is provided by a reset input which is determined by performing logic on selected bits of said first binary value and said second binary value.

47. The prevention means of claim 42, wherein said selected bits are the most significant bits (MSBs) of said first binary value and said second binary value.

48. The difference flag circuitry of claim 24, wherein erroneous flag status is prevented by resetting selected bits of said first binary value and said second binary value to a predetermined state when said selected bits are both equal to a predetermined logic level based upon a reset input, thereby avoiding a wrap-around condition.

49. The difference flag circuitry of claim 48, wherein said selected bits are the most significant bits (MSBs) of said first binary value and said second binary value.

50. A method for generating difference flag circuitry, comprising the steps of:
   comparing the magnitude between a first binary value and a second binary value;
   generating, through the use of a first counter and a second counter, said first binary value and said second binary value wherein at least one of said first counter or said second counter is programmable;
   generating a flag, by initializing said first binary value to a value which is programmably offset from said second binary value by the value of said flag through the use of said first counter and said second counter.

51. The difference flag circuitry of claim 50, wherein at least said first counter or said second counter is initialized to a programmable value.

52. The difference flag circuitry of claim 51, wherein said first counter and second counter have as inputs a reset signal, a program value input, and a clock signal.

53. The difference flag circuitry of claim 51, wherein said second counter is set to a fixed value during an initialization cycle.

54. The difference flag circuitry of claim 53, wherein during an initialization cycle, the fixed value of said second counter is a logic zero.

55. The difference flag circuitry of claim 51, wherein during an initialization cycle, said first counter is initialized to a value determined by said program value input.

56. The difference flag circuitry of claim 55, wherein said program value input is derived from a desired FIFO flag value.

57. The difference flag circuitry of claim 51, wherein said first counter is a read counter and said second counter is a write counter.

* * * * *

UNITED STATES PATENT AND TRADEMARK OFFICE
CERTIFICATE OF CORRECTION

PATENT NO. : 5,381,126
DATED : January 10, 1995
INVENTOR(S) : David C. McClure

It is certified that error appears in the above-indentified patent and that said Letters Patent is hereby corrected as shown below:

On the Title Page, Item [73], delete the word

"Thompson" and substitute --Thomson--.

Signed and Sealed this

Fourth Day of June, 1996

Attest:

BRUCE LEHMAN

*Attesting Officer*     *Commissioner of Patents and Trademarks*